United States Patent
Yang

(10) Patent No.: US 7,379,216 B2
(45) Date of Patent: May 27, 2008

(54) SHEET-FED SCANNING DEVICE USING A SHEET-FEEDING POWER SOURCE FOR CALIBRATION

(75) Inventor: Chi-Ting Yang, Changhua (TW)

(73) Assignee: Avision Inc. (TW)

( * ) Notice: Subject to any disclaimer, the term of this patent is extended or adjusted under 35 U.S.C. 154(b) by 449 days.

(21) Appl. No.: 11/217,331

(22) Filed: Sep. 2, 2005

(65) Prior Publication Data

US 2006/0050333 A1 Mar. 9, 2006

(30) Foreign Application Priority Data

Sep. 8, 2004 (TW) .............................. 93127137 A

(51) Int. Cl.
*H04N 1/04* (2006.01)
*H04N 1/40* (2006.01)

(52) U.S. Cl. ..................... 358/461; 358/496; 358/406; 358/498

(58) Field of Classification Search ................ 358/496, 358/498, 461, 406, 504, 474; 382/274, 312, 382/318, 319; 399/367
See application file for complete search history.

(56) References Cited

U.S. PATENT DOCUMENTS

| 5,280,368 | A  | * | 1/1994  | Fullerton | ..................... 358/474 |
| 6,947,187 | B2 | * | 9/2005  | Mui et al. | .................... 358/496 |
| 2004/0179242 | A1 | * | 9/2004 | Nakaya | ........................ 358/461 |
| 2005/0179959 | A1 | * | 8/2005 | Lien | ........................... 358/406 |
| 2006/0250665 | A1 | * | 11/2006 | Chen | ........................... 358/474 |

\* cited by examiner

*Primary Examiner*—Cheukfan Lee

(57) ABSTRACT

A sheet-fed scanning device includes a scanning module, a sheet-feeding module, a driving module, a calibration sheet moving module, and a calibration sheet. The sheet-feeding module transports a document across a scan region, in which the scanning module scans the document. The driving module drives the sheet-feeding module and the calibration sheet moving module. The calibration sheet is moved to the scan region before the document is transported, is gradually moved away from the scan region as the document is being transported so that the scanning module scans a plurality of scan lines on the calibration sheet for calibration, and is moved completely out of the scan region when the document reaches the scan region, such that the scanning module scans the document thereafter. The calibration sheet cannot be moved back to the scan region until the driving module reverses.

4 Claims, 4 Drawing Sheets

SHEET-FED SCANNING DEVICE USING A SHEET-FEEDING POWER SOURCE FOR CALIBRATION

BACKGROUND OF THE INVENTION

1. Field of the Invention

The invention relates to a sheet-fed scanning device, and more particularly to a sheet-fed scanning device using a sheet-feeding power source, which is also used for moving documents to be scanned, for calibration.

2. Description of the Related Art

When a prior art sheet-fed scanner performs a color or brightness calibration, a calibration sheet is firstly transported into the scanner as a calibration basis for the standard color or brightness before the scanner scans a document. However, the calibration sheet tends to be lost and the calibration method is not very human-oriented.

In another method, a scanning module of a scanner only scans a single scan line on a calibration sheet, which is located in the scanner, as a calibration basis for the standard color or brightness. However, when the scan line is contaminated, the calibration basis for the standard color or brightness becomes inaccurate.

In still another method, a motor and a gear set, which are different from those for driving the sheet-feeding module, have to be used in conjunction with a detector for detecting a position of a calibration sheet so as to scan a plurality of scan lines on the calibration sheet as a calibration basis for the standard color or brightness. When the calibration has to be made, the motor rotates to move the calibration sheet into the range of the scan window. After the scan lines have been scanned, the detector detects the position of the calibration sheet and the motor is controlled to reverse the calibration sheet out of the range of the scan window and back to the initial position.

In this calibration method, a dedicated set of a motor, a gear set, a detector and associated control circuits is needed. So, the number of components is great and the cost is high.

SUMMARY OF THE INVENTION

It is therefore an object of the invention to provide a sheet-fed scanning device using a sheet-feeding power source, which is also used for moving documents to be scanned, for calibration so as to decrease the number of motors and control circuits and to reduce the cost.

To achieve the above-mentioned object, the invention provides a sheet-fed scanning device including a scanning module, a sheet-feeding module, a driving module, a calibration sheet moving module and a calibration sheet. The scanning module scans a document in a scan region. The sheet-feeding module transports the document across the scan region. The driving module drives the sheet-feeding module and the calibration sheet moving module. The calibration sheet moving module moves the calibration sheet disposed inside the sheet-fed scanning device. The calibration sheet is moved to the scan region before the document is transported, is gradually moved away from the scan region as the document is being transported such that the scanning module scans a plurality of scan lines on the calibration sheet for calibration, and is moved completely out of the scan region when the document reaches the scan region, such that the scanning module scans the document thereafter. The calibration sheet cannot be moved back to the scan region until the driving module reverses.

According to the sheet-fed scanning device stated hereinabove, it is possible to reduce the cost, shorten the scanning time for calibration, and prevent the dust from being retained in the scanning device.

DETAILED DESCRIPTION OF THE INVENTION

Figure 1:
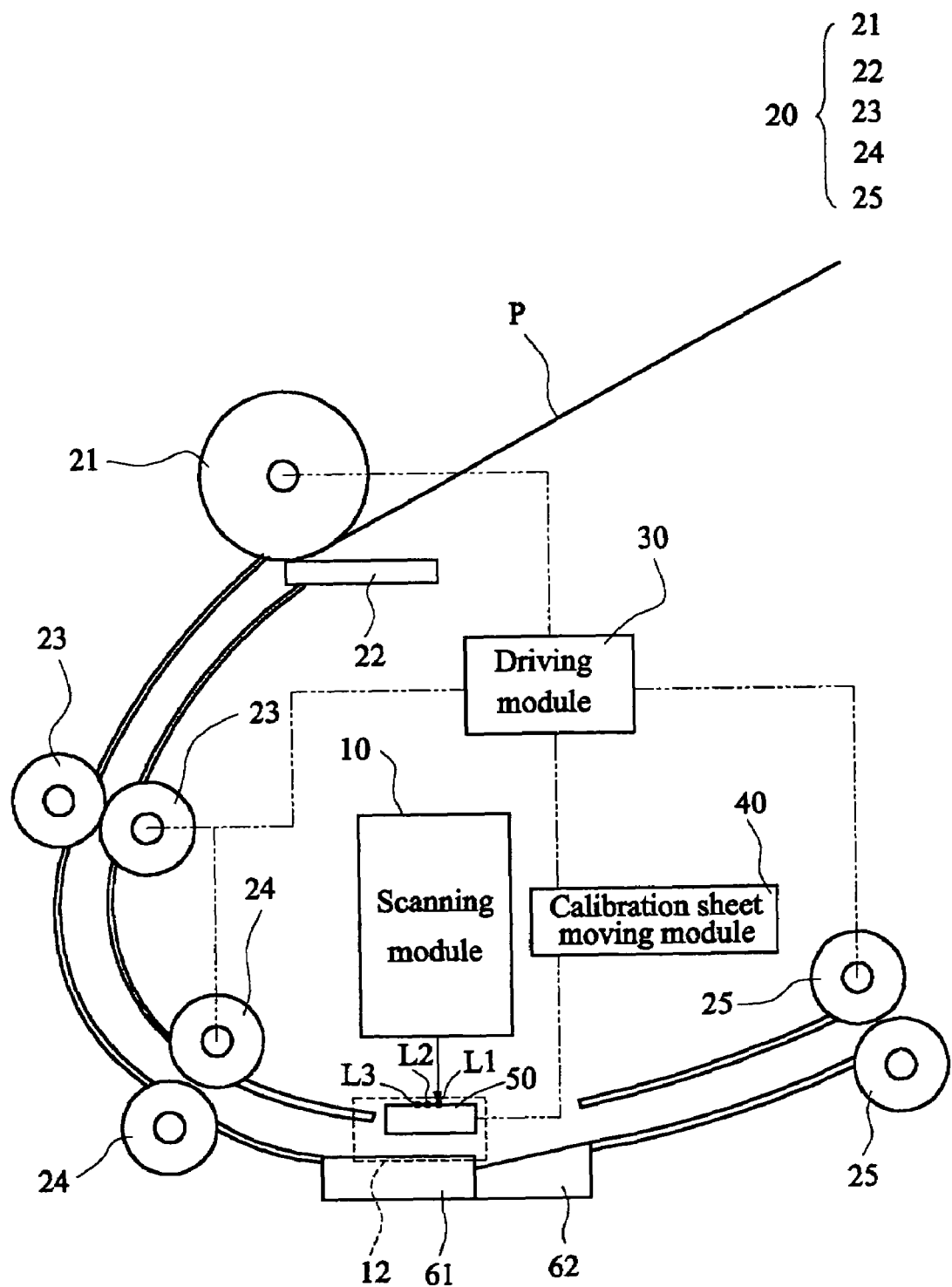
FIG. 1 is a schematic illustration showing a first state of a sheet-fed scanning device according to a preferred embodiment of the invention.
Figure 2:
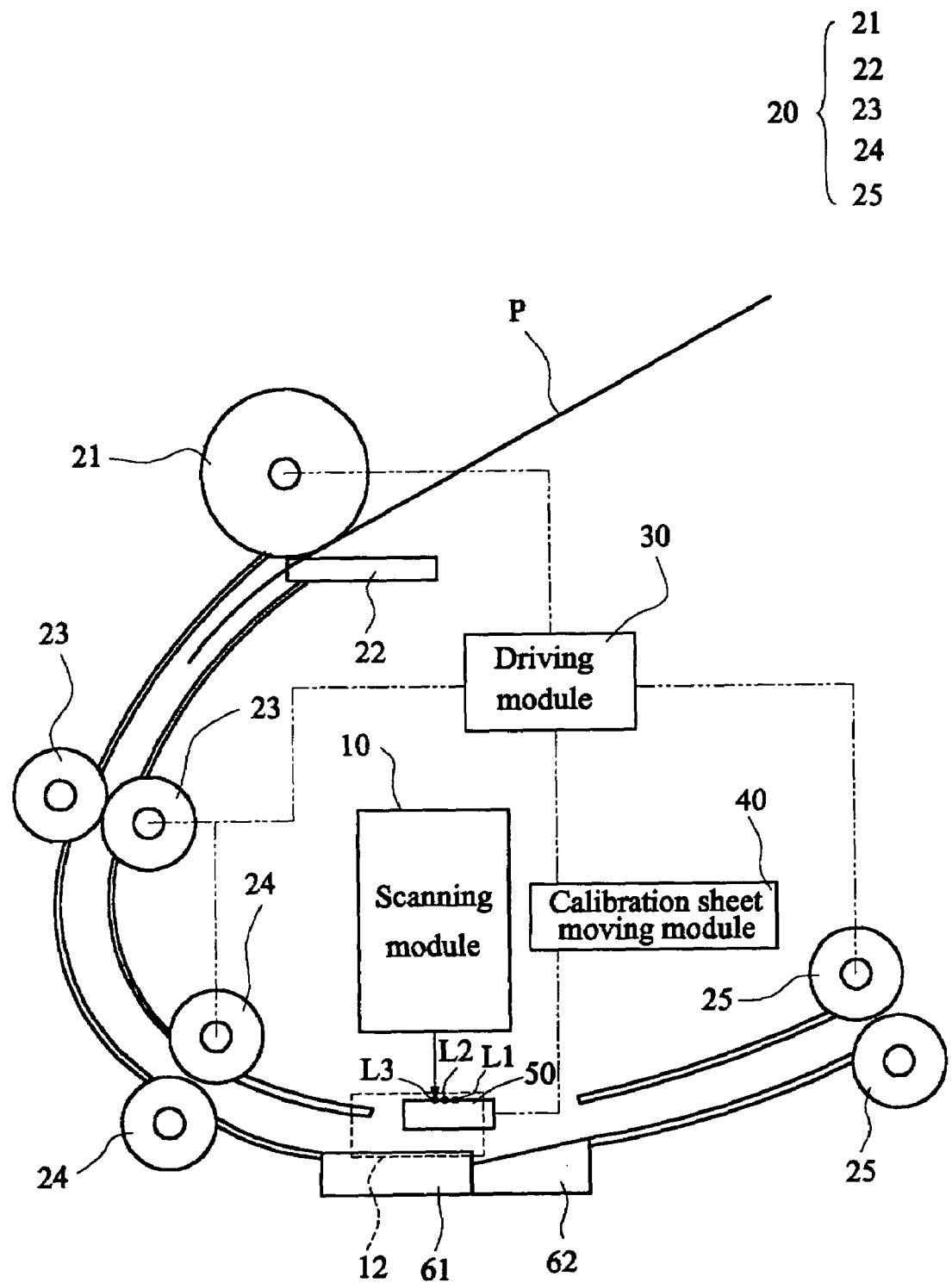
FIG. 2 is a schematic illustration showing a second state of the sheet-fed scanning device according to the preferred embodiment of the invention.
Figure 3:
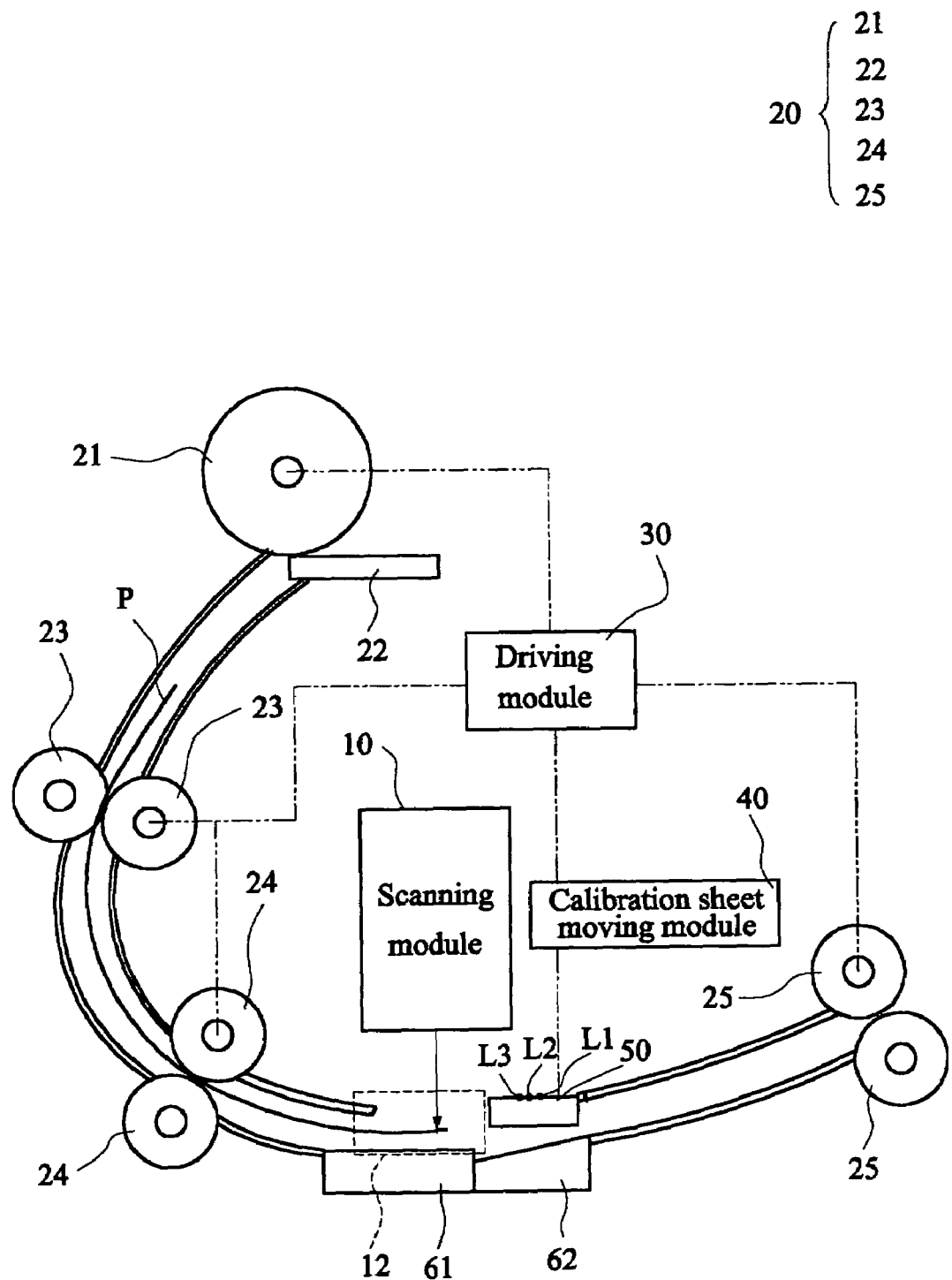
FIG. 3 is a schematic illustration showing a third state of the sheet-fed scanning device according to the preferred embodiment of the invention.

FIGS. 1 to 3 are schematic illustrations showing first to third states of a sheet-fed scanning device according to a preferred embodiment of the invention. Referring to FIGS. 1 to 3, a sheet-fed scanning device of the invention using a sheet-feeding power source for calibration includes a scanning module 10, a sheet-feeding module 20, a driving module 30, a calibration sheet moving module 40 and a calibration sheet 50. The scanning module 10 is stationary in the scanning device and scans a document P in a scan region 12. The scanning module 10 may include a charge coupled device (CCD) sensor or a contact image sensor (CIS). The sheet-feeding module 20 transports the document P across the scan region 12. The sheet-feeding module 20 typically includes a sheet-input roller 21, a sheet separator 22 and a plurality of rollers 23 to 25. The driving module 30 typically includes a motor and a gear set for driving the sheet-feeding module 20. In this embodiment, the driving module 30 drives the sheet-feeding module 20 and the calibration sheet moving module 40 simultaneously.

The calibration sheet moving module 40 moves the calibration sheet 50 disposed inside the sheet-fed scanning device. Before the document P is transported, the calibration sheet 50 is moved to the scan region 12 and is located above a glass window 61. That is, a start position of the calibration sheet 50 is in the scan region 12, as shown in FIG. 1. When the document P is being transported, the calibration sheet 50 is gradually moved away from scan region 12, such that the scanning module 10 scans a plurality of scan lines L1, L2 and L3 on the calibration sheet 50 for calibration, as shown in FIG. 2. Before the document P reaches the scan region 12, the calibration sheet 50 is moved completely out of the scan region 12 and located above a guide plate 62 such that the scanning module 10 scans the document P thereafter, as shown in FIG. 3.

Usually, only one standard color and brightness calibration has to be made before the scanning module 10 scans a stack of documents. Thus, when the scanning module 10 is scanning the documents, the calibration sheet 50 is kept at the position shown in FIG. 3, and cannot be moved back to the scan region 12 and cannot return to the state of FIG. 1 until the driving module 30 reverses.

In order to make the calibration sheet 50 have the above-mentioned behaviors, the calibration sheet moving module 40 must be particularly designed. For example, it is possible to use a friction roller or a ratchet in conjunction with associated mechanisms, or to use an electromagnetic clutch, as described hereinbelow.

Figure 4:
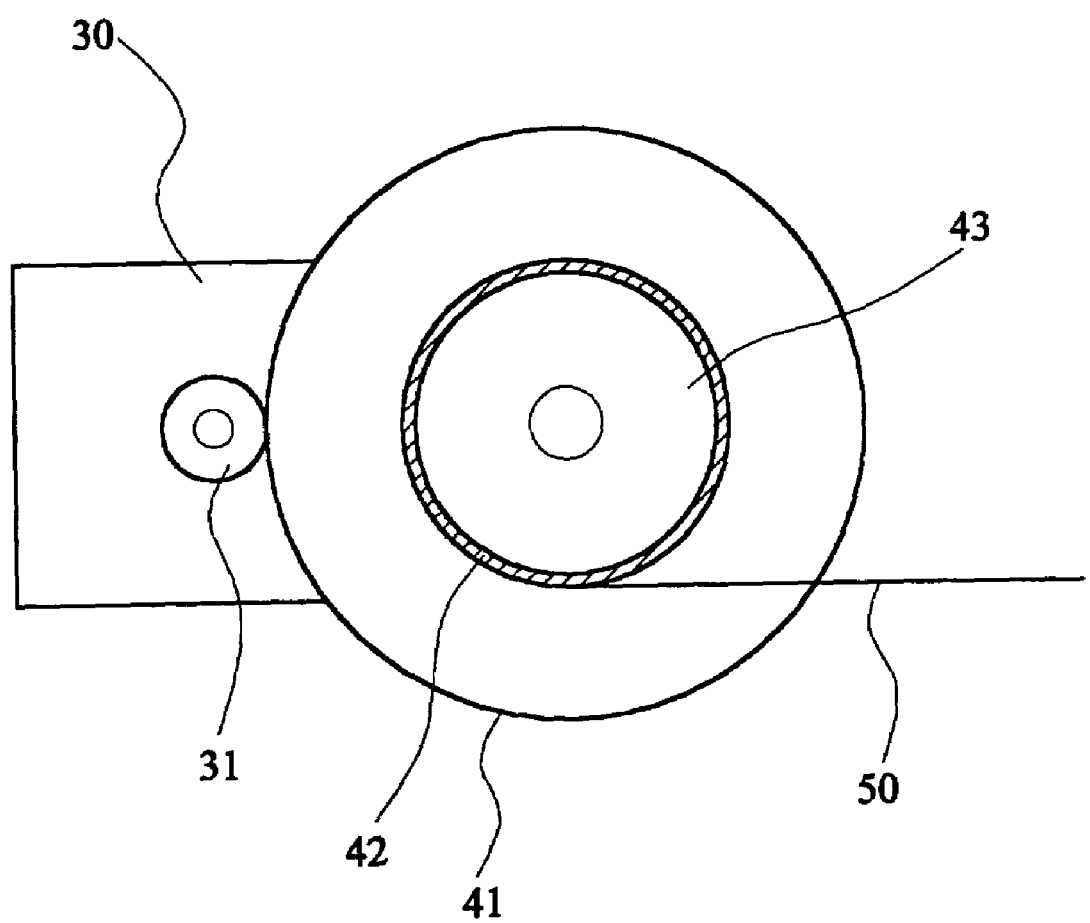
FIG. 4 shows an example of the driving module and the calibration sheet moving module of FIG. 1.

FIG. 4 shows an example of the driving module and the calibration sheet moving module of FIG. 1. As shown in FIG. 4, the calibration sheet moving module 40 includes a gear 41 driven by a gear 31 of the driving module 30. The gear 41 drives a coaxial roller 43 with a lock/unlock mechanism (e.g., an electromagnetic clutch) 42, and the calibration sheet 50 is wrapped around the outer circumference of the roller 43. Controlling the lock/unlock mechanism 42 to lock the gear 41 and the roller 43 together or unlock the gear 41 from the roller 43 prevents the calibration sheet moving module 40 from moving the calibration sheet 50 after the calibration sheet 50 is moved completely out of the scan region 12, and enables the calibration sheet moving module 40 to reverse the calibration sheet 50 after the driving module 30 reverses.

In the prior art, the calibration sheet is located out of the scan region when the scanning device is on standby, is located within the scan region during the calibration scanning process, and is outside the scan region when the document is being scanned. In this invention, however, the calibration sheet is located in the scan region when the scanning device is on standby and the calibration scanning process is performed, and is outside the scan region when the document is being scanned. Compared to the prior art, the invention has the following advantages.

First, using the power source for driving the driving module to move the calibration sheet can save a set of a motor, a detector and associated control circuits. Second, performing the calibration scanning operation before the document reaches the scan region can save the time for performing the calibration scanning operation and transporting the document. Third, the calibration sheet, which is on standby, is located in the scan region, so it is possible to prevent the dust from entering the scanning module or being retained in the optical path of the scanning module, and the dust-free effect may be enhanced.

While the invention has been described by way of examples and in terms of a preferred embodiment, it is to be understood that the invention is not limited to the disclosed embodiment. To the contrary, it is intended to cover various modifications. Therefore, the scope of the appended claims should be accorded the broadest interpretation so as to encompass all such modifications.

What is claimed is:

1. A sheet-fed scanning device, comprising:
   a scanning module for scanning a document in a scan region;
   a sheet-feeding module for transporting the document across the scan region;
   a calibration sheet moving module moving a calibration sheet disposed inside the sheet-fed scanning device; and
   a driving module for driving the sheet-feeding module and the calibration sheet moving module;
   wherein the calibration sheet is moved to the scan region before the document is transported, is gradually moved away from the scan region as the document is being transported such that the scanning module scans a plurality of scan lines on the calibration sheet for calibration, and is moved completely out of the scan region when the document reaches the scan region, such that the scanning module scans the document thereafter, and the calibration sheet cannot be moved back to the scan region until the driving module reverses.

2. The sheet-fed scanning device according to claim 1, wherein the calibration sheet moving module comprises:
   a lock/unlock mechanism for preventing the calibration sheet moving module from moving the calibration sheet after the calibration sheet is moved completely out of the scan region, and enabling the calibration sheet moving module to reverse the calibration sheet after the driving module reverses.

3. The sheet-fed scanning device according to claim 2, wherein the lock/unlock mechanism is an electromagnetic clutch.

4. The sheet-fed scanning device according to claim 1, wherein the driving module is a motor.

* * * * *